US011974963B2

(12) United States Patent
Jung

(10) Patent No.: US 11,974,963 B2
(45) Date of Patent: May 7, 2024

(54) MASSAGE CHAIR CAPABLE OF MASSAGING FRONT BODY REGION

(71) Applicant: Jae Hun Jung, Goyang-si (KR)

(72) Inventor: Jae Hun Jung, Goyang-si (KR)

( * ) Notice: Subject to any disclaimer, the term of this patent is extended or adjusted under 35 U.S.C. 154(b) by 810 days.

(21) Appl. No.: 16/979,225

(22) PCT Filed: Sep. 6, 2018

(86) PCT No.: PCT/KR2018/010389
§ 371 (c)(1),
(2) Date: Sep. 9, 2020

(87) PCT Pub. No.: WO2019/182209
PCT Pub. Date: Sep. 26, 2019

(65) Prior Publication Data

US 2020/0397644 A1 Dec. 24, 2020

(30) Foreign Application Priority Data

Mar. 21, 2018 (KR) ........................ 10-2018-0032383

(51) Int. Cl.
*A61H 7/00* (2006.01)
*A47C 7/62* (2006.01)

(52) U.S. Cl.
CPC ................. *A61H 7/00* (2013.01); *A47C 7/62* (2013.01); *A61H 2201/1626* (2013.01); *A61H 2201/1671* (2013.01); *A61H 2203/0431* (2013.01); *A61H 2205/083* (2013.01); *A61H 2205/084* (2013.01)

(58) Field of Classification Search
CPC .............. A61H 7/00; A61H 2201/1626; A61H 2201/1671; A61H 2203/0431; A61H 2205/084
USPC ........................................................ 297/217.1
See application file for complete search history.

(56) References Cited

U.S. PATENT DOCUMENTS 3,262,716 A * 7/1966 Graham .................. B60R 21/02 280/751
3,713,694 A * 1/1973 Miller ...................... B60R 21/02 297/216.13
3,837,670 A * 9/1974 Hilyard ................... B60R 21/08 297/488
3,874,476 A * 4/1975 Monaghan ............. B60R 21/02 297/488
3,888,329 A * 6/1975 Monaghan .............. B60R 21/02 297/488

(Continued)

FOREIGN PATENT DOCUMENTS

JP 2005-144059 A 6/2005
JP 2012-143526 A 8/2012

(Continued)

*Primary Examiner* — Jose V Chen
(74) *Attorney, Agent, or Firm* — Bridgeway IP Law Group, PLLC; Jihun Kim

(57) ABSTRACT

A massage chair capable of massaging the front body region is proposed. In the massage chair, one end is rotatably coupled to the backrest part and the backrest part for supporting the user's back, and includes a front massage part for massaging the user's abdomen or chest. According to the present configuration, there is proposed a massage chair capable of performing massage even in a front body region of a person to be treated, such as a chest or an abdomen.

3 Claims, 8 Drawing Sheets

(56) References Cited

U.S. PATENT DOCUMENTS

| | | | | |
|---|---|---|---|---|
| 3,899,042 | A * | 8/1975 | Bonar | B60R 21/02 297/487 |
| 3,901,550 | A * | 8/1975 | Hamy | B60R 21/02 297/488 |
| 4,509,798 | A * | 4/1985 | Strothers | B60R 21/02 297/487 |
| 4,813,746 | A * | 3/1989 | Mulholland | A61G 5/1091 297/464 |
| 5,542,746 | A * | 8/1996 | Bujaryn | A47C 9/005 297/301.1 |
| 5,582,464 | A * | 12/1996 | Maymon | A47C 1/023 297/358 |
| 6,619,733 | B2 * | 9/2003 | Pearson | A47C 7/68 297/391 |
| 10,272,865 | B2 * | 4/2019 | Nagasawa | B60R 21/18 |
| 10,384,566 | B2 * | 8/2019 | Kondrad | B60R 22/26 |
| 11,166,564 | B2 * | 11/2021 | Simhan | A47C 7/405 |
| 11,685,294 | B2 * | 6/2023 | Bohrmann | B60N 2/0232 297/354.1 |
| 2012/0068521 | A1 * | 3/2012 | Roodenburg | B60R 21/026 297/487 |
| 2015/0015040 | A1 * | 1/2015 | Qiu | A47C 7/506 74/25 |
| 2015/0076890 | A1 * | 3/2015 | Planer | B60R 22/00 297/487 |
| 2020/0222124 | A1 * | 7/2020 | Savall | A61B 34/37 |

FOREIGN PATENT DOCUMENTS

| | | | |
|---|---|---|---|
| JP | 5279190 | B2 | 9/2013 |
| KR | 10-2009-0098572 | A | 9/2009 |
| KR | 10-2016-0049621 | A | 5/2016 |
| KR | 10-1883306 | B1 | 7/2018 |
| WO | WO-9116874 | A1 * | 11/1991 |

* cited by examiner

MASSAGE CHAIR CAPABLE OF MASSAGING FRONT BODY REGION

TECHNICAL FIELD

The present invention relates to a massage chair, and more specifically, to a massage chair capable of performing a massage treatment even in a front body region of a person to be treated, such as a chest or an abdomen.

BACKGROUND ART

Recently, as the market size of a massage chair has grown rapidly in Korea, massage chairs which provide a massage function differentiated from the conventional massage chair are rushing to market.

Meanwhile, there is an old technical challenge in the massage chairs to develop a massage chair which provides the same function and effect as the massage service provided with hand by a masseur rather than a machine. To this end, massage modules that provide various functions such as an acupressure massage module, a tapping massage module, an arm massage module, and a leg massage module have been developed.

However, in general, the massage service directly provided by the masseur is performed evenly in a back body region such as a back or buttocks of a person to be treated, as well as a front body region of the person to be treated such as a chest or abdomen, whereas the massage chair developed so far has a technical limitation that it does not provide a massage treatment function in the front region of the person to be treated, such as the chest or abdomen of the person to be treated.

SUMMARY OF INVENTION

Problems to be Solved by Invention

Accordingly, it is an object of the present invention to provide a massage chair capable of performing a massage treatment even in a front body region of a person to be treated, such as a chest or an abdomen.

Means for Solving Problems

To achieve the above-described object, according to an aspect of the present invention, there is provided a massage chair including: a backrest part configured to support a back of a user; and a front massage part rotatably coupled to the backrest part through one end thereof, and configured to perform a massage on an abdomen or chest of the user.

Preferably, the front massage part is slidably coupled to a rear surface of the backrest part.

Advantageous Effects

According to the present invention, there is provided a massage chair capable of performing a massage treatment in a front body region of a person to be treated, such as a chest or an abdomen.

MODE FOR CARRYING OUT INVENTION

Figure 1:
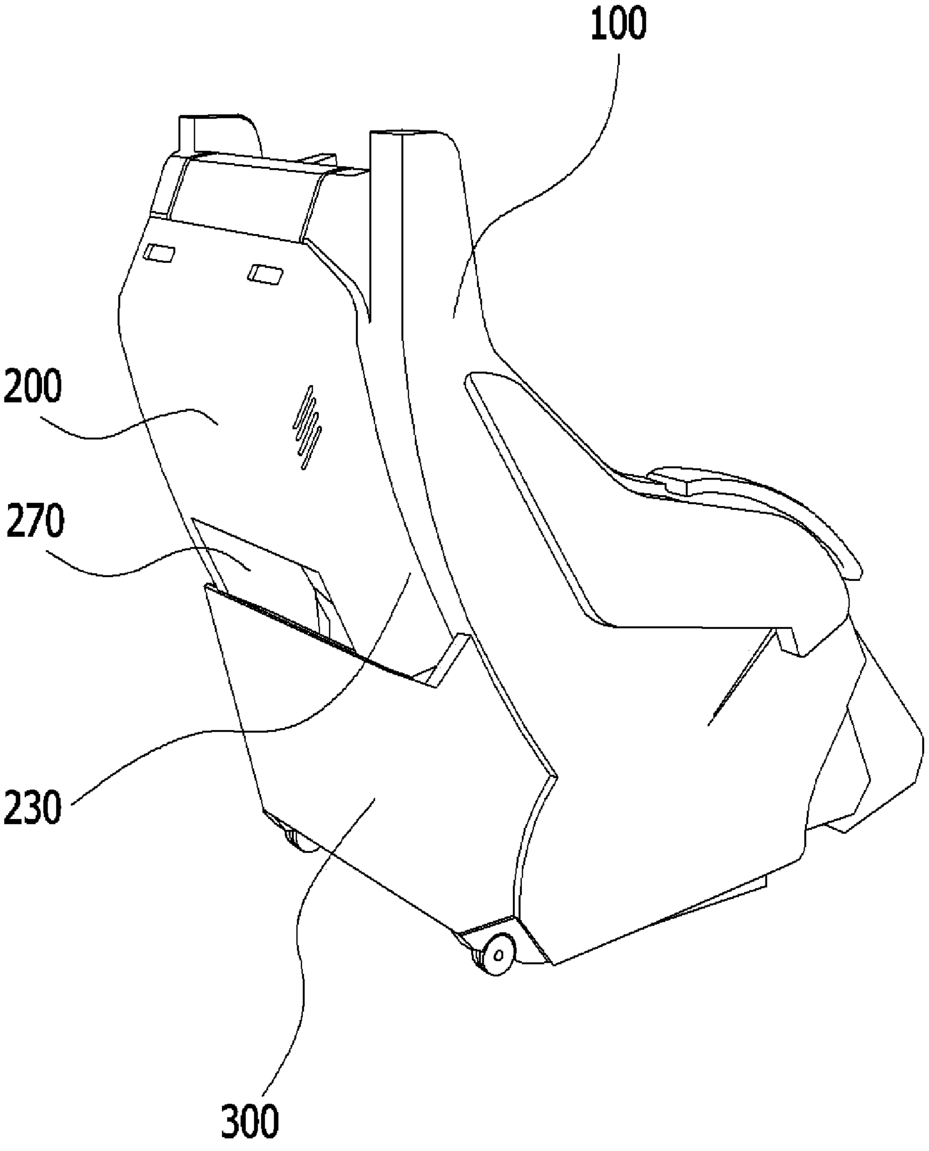
FIG. 1 is a perspective view illustrating a rear structure of a massage chair according to an embodiment of the present invention.

Hereinafter, the present invention will be described with reference to the accompanying drawings in detail. Referring to the drawings, wherein like reference characters designate like or corresponding parts throughout the several views. In the embodiments of the present invention, the publicly known functions and configurations that are judged to be able to make the purport of the present invention unnecessarily obscure will not be described.

FIG. 1 is a perspective view illustrating a rear structure of a massage chair according to an embodiment of the present invention. Referring to FIG. 1, the massage chair according to an embodiment of the present invention includes a backrest part 100 and a front massage part 200.

The backrest part 100 functions to perform a massage in a back region of a user through a back massage module provided therein in a state of supporting the back of the user.

Meanwhile, the front massage part 200 includes a front massage module 210 provided therein, which performs a massage on an abdomen or chest of the user. Such the front massage part 200 is stored with being coupled and installed to a rear surface of the backrest part 100 in an unused state as shown in FIG. 1.

Figure 2:
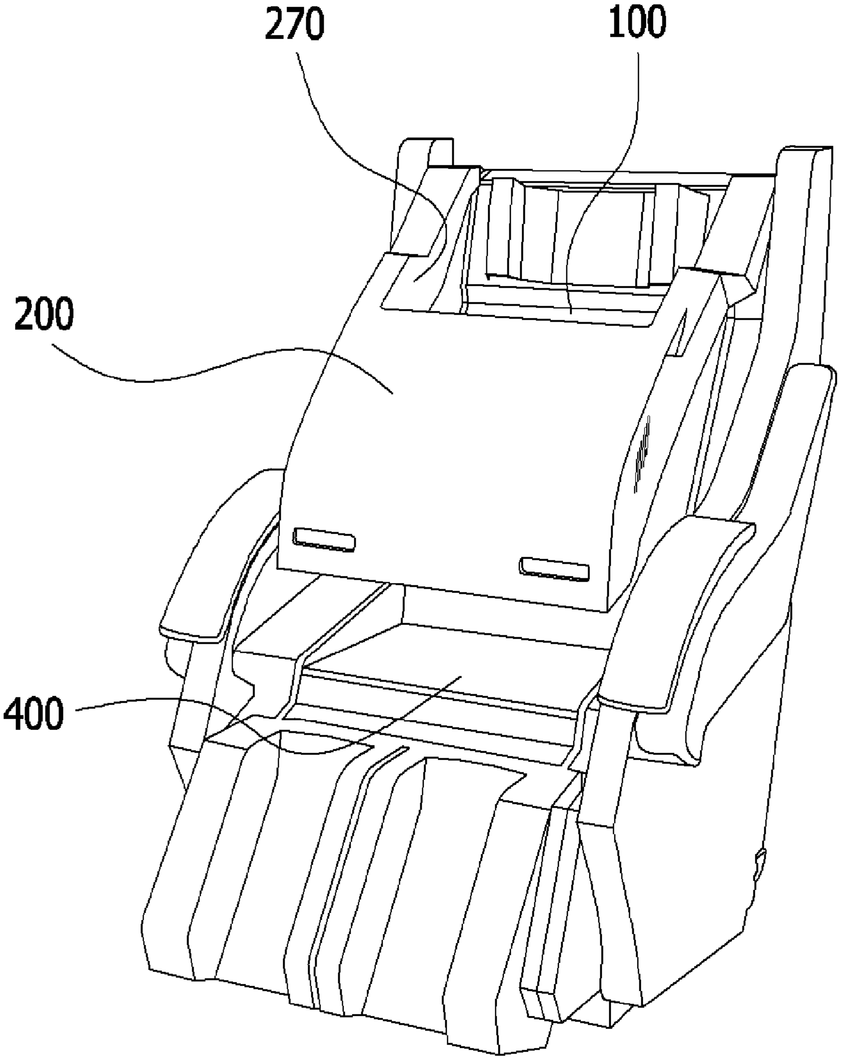
FIG. 2 is a perspective view illustrating a front structure of the massage chair according to an embodiment of the present invention in a use state thereof.

FIG. 2 is a perspective view illustrating a front structure of the massage chair according to an embodiment of the present invention in a use state thereof. As shown in FIG. 2, in order to perform a massage on the abdomen or chest of the user according to a selection of the user who uses the massage chair, the front massage part 200 is located in front of the user.

Figure 6:
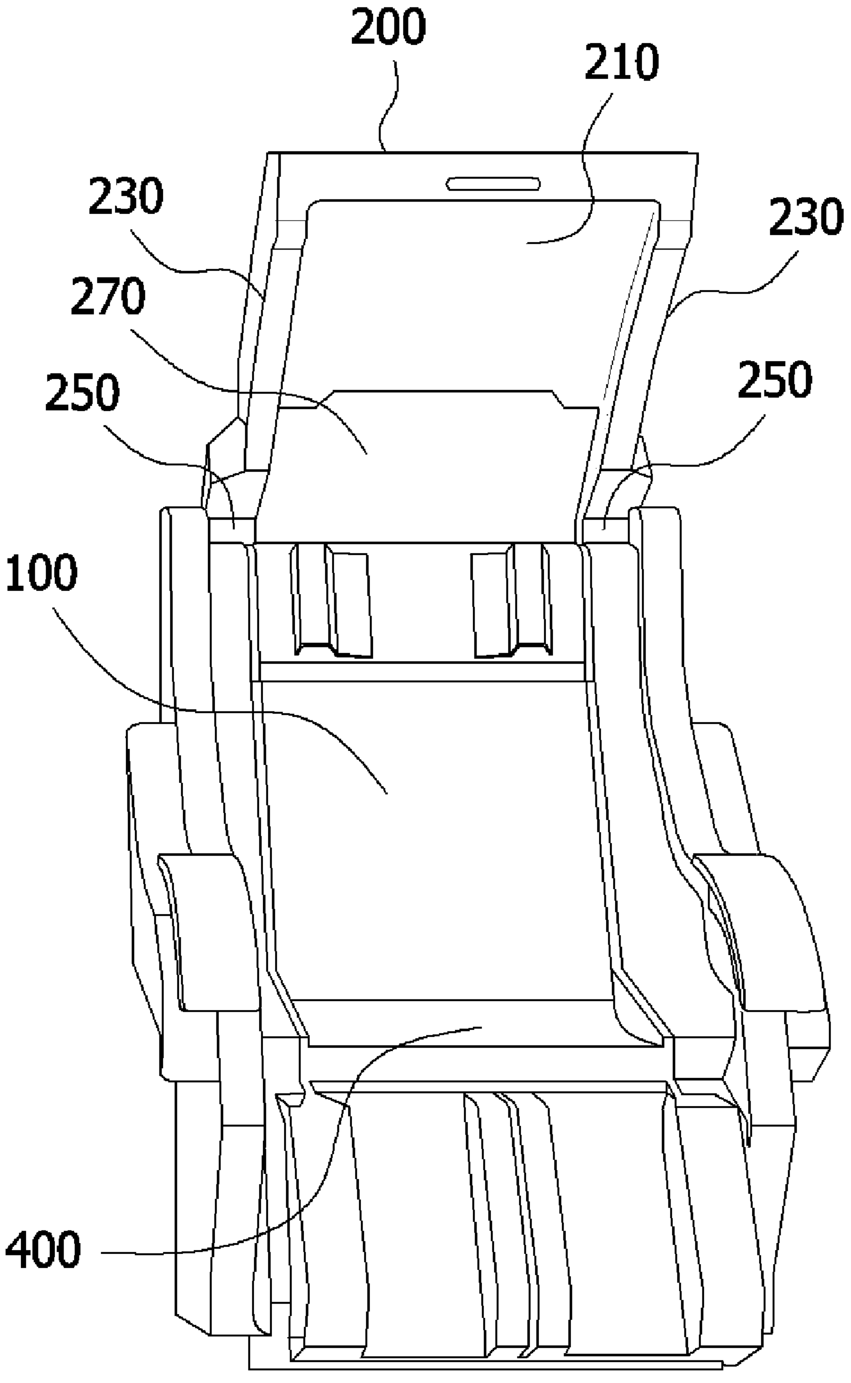
Figure 7:
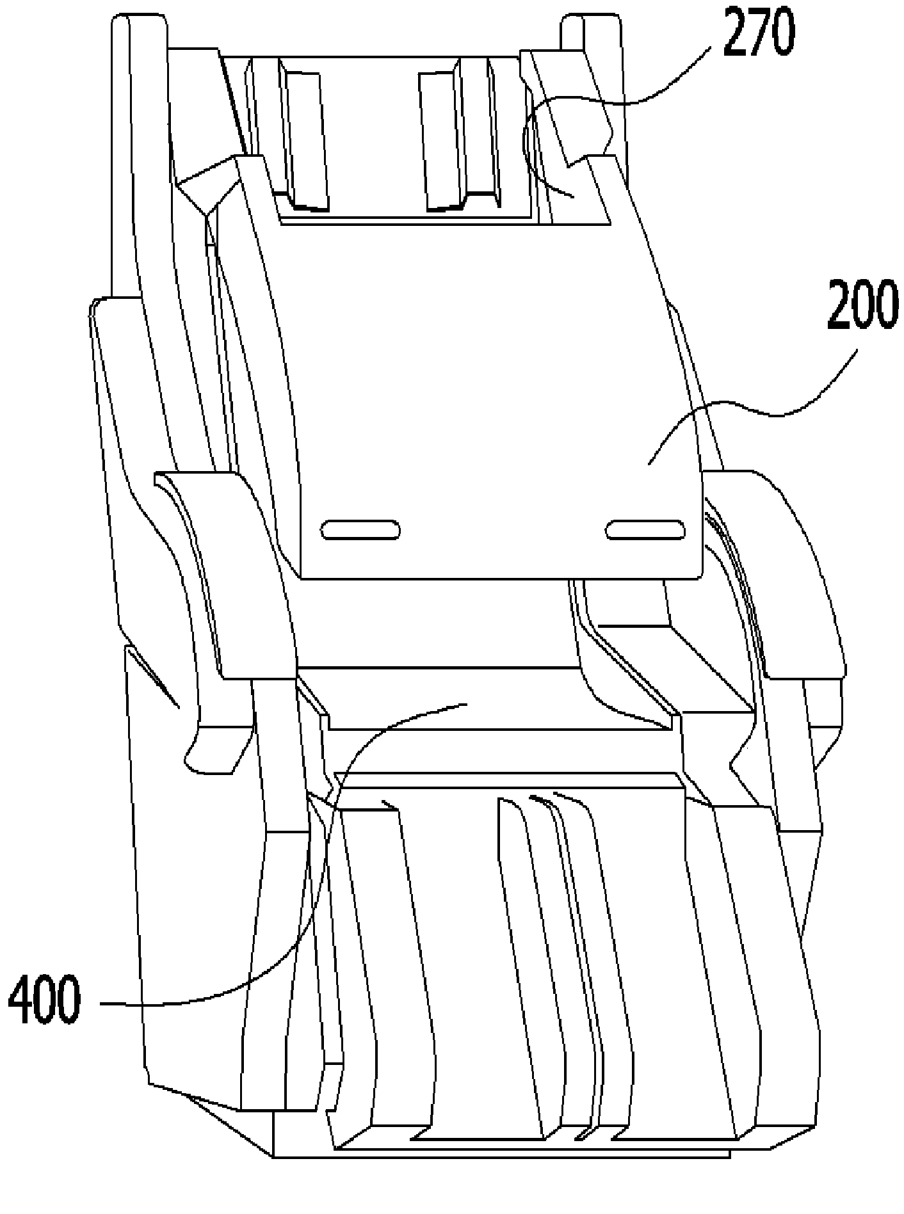
Figure 8:
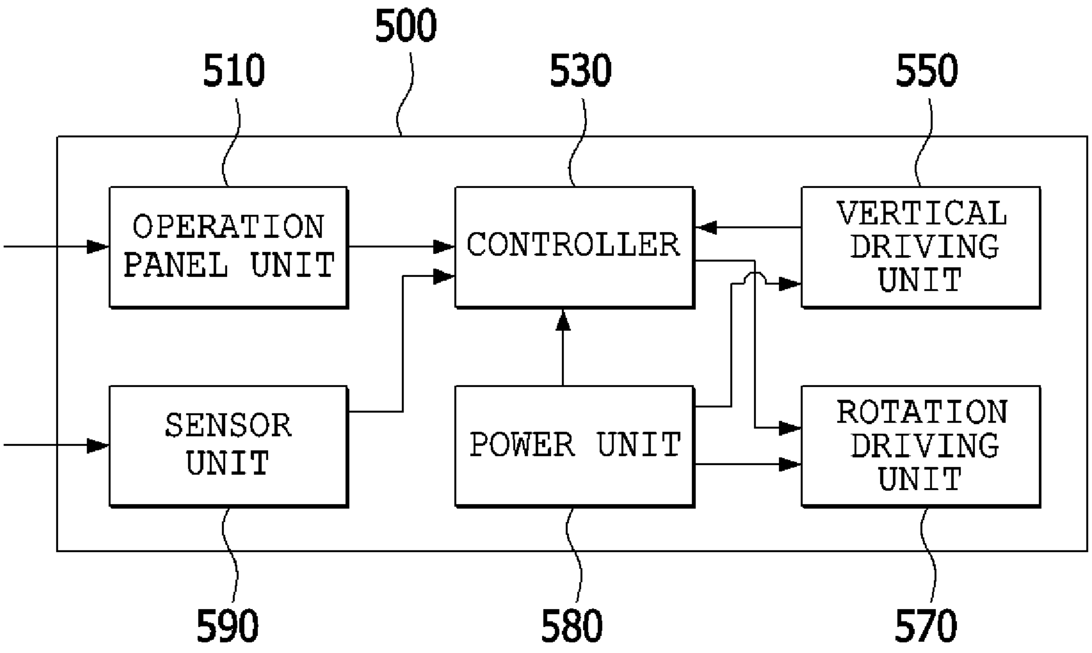
FIG. 8 is a functional block diagram illustrating a structure of a main body unit of the massage chair according to an embodiment of the present invention.

FIGS. 3 to 7 are perspective views illustrating processes of moving and installing the front massage part 200 during using the massage chair according to an embodiment of the present invention, and FIG. 8 is a functional block diagram illustrating a structure of a main body unit 500 of the massage chair according to an embodiment of the present invention.

Referring to FIG. 8, the main body unit 500 of the massage chair according to an embodiment of the present invention includes an operation panel unit 510, a controller 530, a vertical driving unit 550, a rotation driving unit 570, a power unit 580, and a sensor unit 590.

First, the operation panel unit 510 is an input device implemented as a touch type display device used by the user of the massage chair to control functions of the massage chair. The controller 530 controls the vertical driving unit 550 and the rotation driving unit 570 according to a control command input through the operation panel unit 510 by the user.

Meanwhile, the vertical driving unit 550 drives the front massage part 200 in a vertical direction, and the rotation driving unit 570 performs a function of rotating the front massage part 200 in a hinged manner.

The power unit 580 supplies an operating power to the massage chair according to the present invention. The sensor unit 590 includes a plurality of pressure sensors and proximity sensors, and transmits detection information sensed from each sensor to the controller 530.

Hereinafter, processes of moving and installing the front massage part 200 during using the massage chair according to an embodiment of the present invention will be described with reference to FIGS. 1 to 8.

Figure 3:
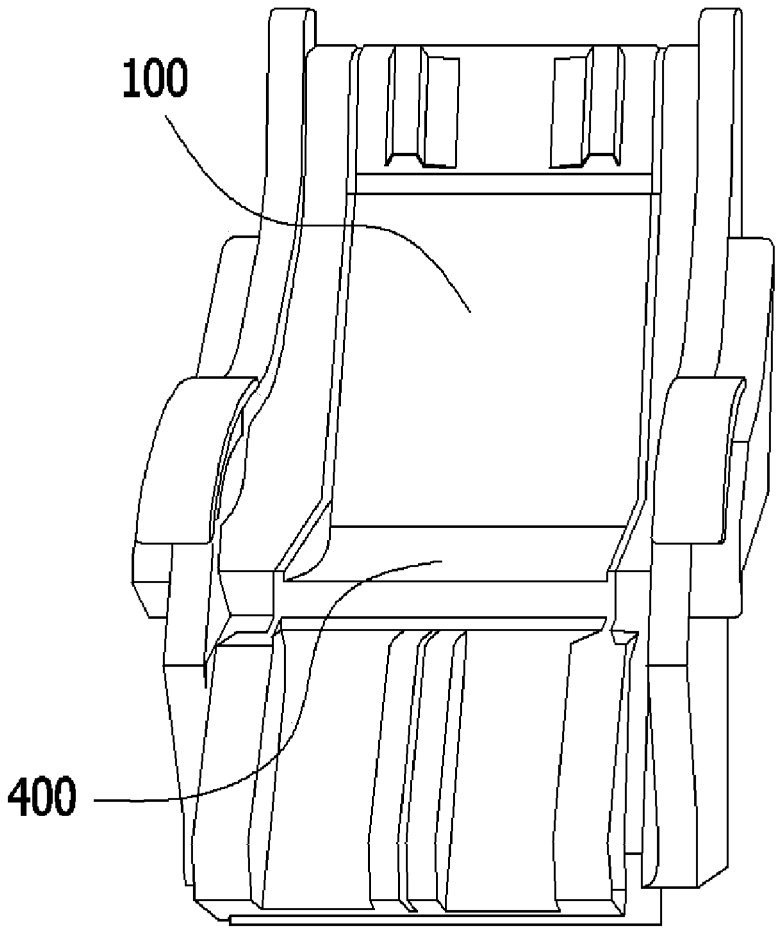
FIGS. 3 to 7 are perspective views illustrating processes of moving and installing a front massage part during using the massage chair according to an embodiment of the present invention.

First, in the state shown in FIG. 3, when the user seated on the massage chair selects a front massage function using a 'front massage' button provided on the operation panel unit 510 of the massage chair, the front massage part is located and installed in front of the user in accordance with execution processes shown in FIGS. 4 to 7.

Meanwhile, as shown in FIG. 1, the front massage part 200 is installed on the rear surface of the backrest part 100. At this time, it is preferable that the front massage part is installed slidably in the vertical direction on the rear surface of the backrest part 100.

Specifically, a pair of movement guide members 230 having a rail structure extending in a longitudinal direction are installed on a coupling surface of the front massage part 200, which is coupled to the rear surface of the backrest part 100. In addition, a pair of guide grooves are continuously formed in the coupling surface of the backrest part 100, which is coupled to the front massage part 200, in the longitudinal direction, so that the movement guide members 230 are inserted into the guide grooves to guide the sliding movement of the front massage part 200.

Meanwhile, the front massage part 200 is normally installed with being coupled to the rear surface of the backrest part 100. In this case, it is preferable that a head receiving part 270, which is an opening provided in the front massage part 200 to receive a head of the user, is installed so as to be inserted into a housing part 300 formed in a lower portion of the rear surface of the backrest part 100.

As a result, as shown in FIG. 1, a lower portion of the front massage part 200 is inserted into the housing part 300 whose upper portion is open, such that the front massage part 200 may maintain a more stable coupling state with the rear surface of the backrest part 100.

Meanwhile, it is preferable that the housing part 300 is provided with the vertical driving unit 550 installed in a lower portion of the front massage part 200 to move the front massage part 200 in the vertical direction.

Figure 4:
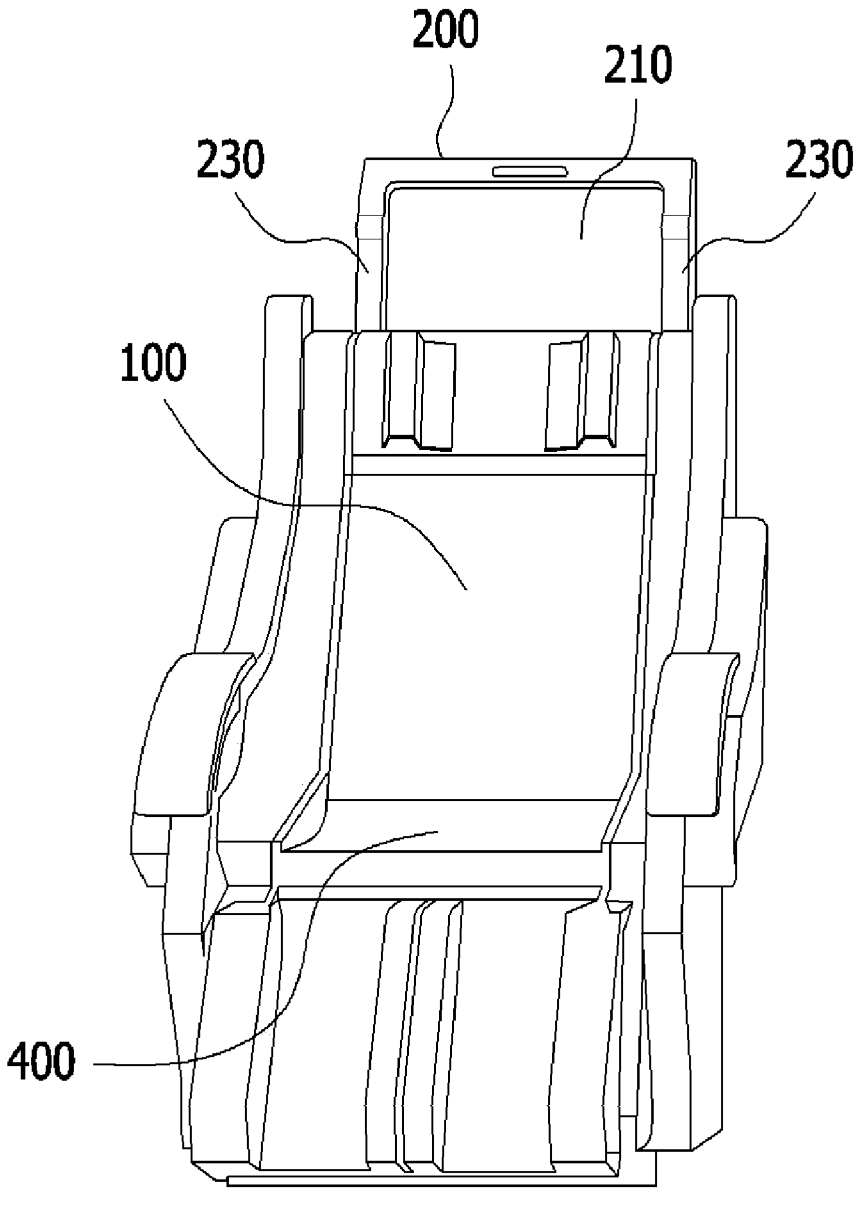

Thereby, when the user selects a front massage function using the 'front massage' button provided on the operation panel unit 510, the controller 530 controls to drive the vertical driving unit 550 upward. Therefore, the front massage part 200 slides upward along the rear surface of the backrest part 100 to which the front massage part is coupled in a rail manner as shown in FIGS. 4 and 5.

Figure 5:
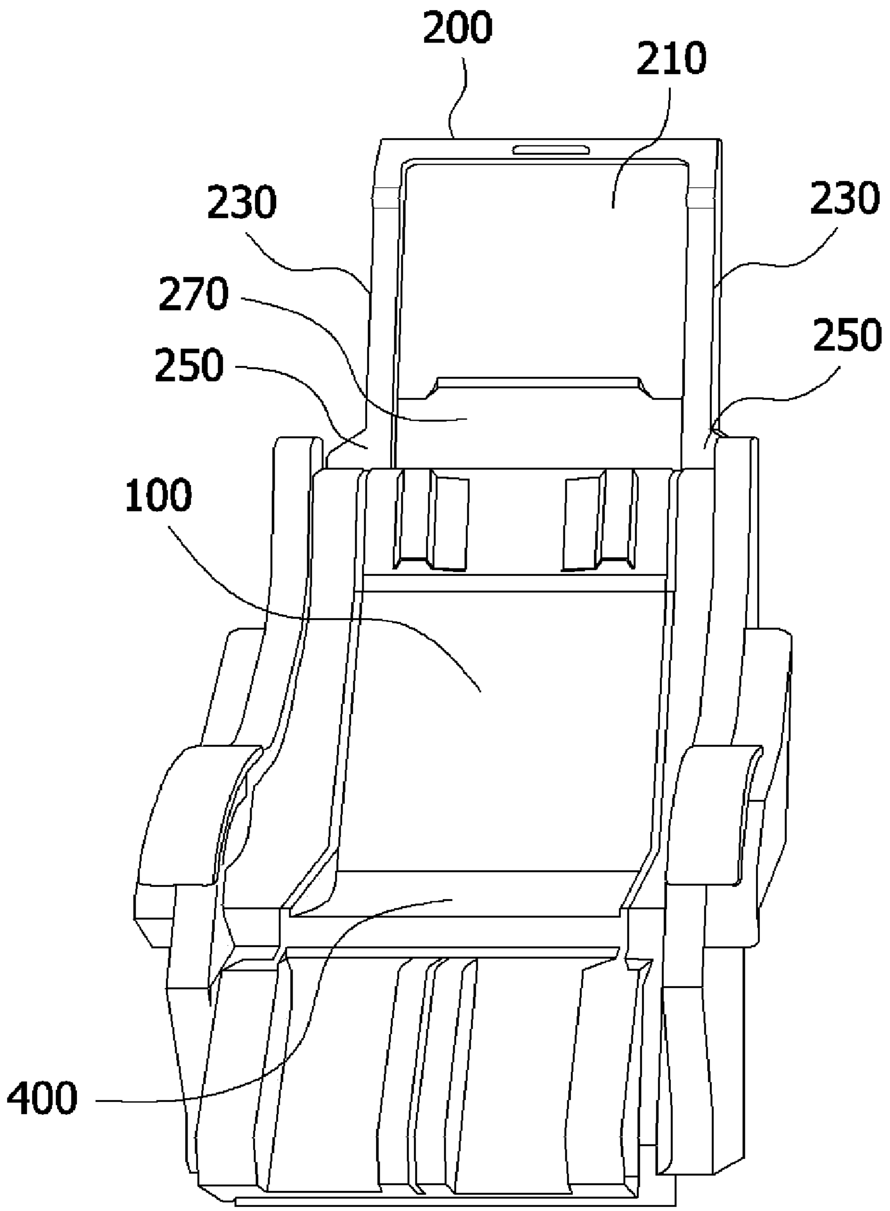

As a result, as shown in FIG. 5, the rotation parts 250 of a hinge structure, which are respectively installed on left and right sides of the lower end of the front massage part 200 are located at the upper end of the backrest part 100. As such, when the rotation parts 250 are located at the upper end of the backrest part 100, the controller 530 controls to drive the rotation driving unit, such that the rotation part 250 is driven in a hinged manner. Therefore, the front massage part 200 is located in front of the user while gradually rotating in a hinged manner as shown in FIGS. 6 and 7.

Meanwhile, in this process, the head and shoulder portions of the user are exposed above the upper portion of the front massage part 200 through the head receiving part 270 provided in the lower portion of the front massage part 200. Next, the controller 530 controls to drive the front massage module provided inside the front massage part 200 in close contact with the abdomen or chest of the user, thereby performing a massage treatment on the abdomen or chest of the user.

Further, for embodying the present invention, the sensor unit 590 provided in the main body unit 500 of the massage chair may include a first pressure sensor installed in an inner surface of the front massage part 200 to be come into contact with the abdomen or chest of the user, a second pressure sensor installed in a seat cushion part 400 of the massage chair, and proximity sensors installed in an inner edge portion of the head receiving part 270 of the front massage part 200.

As a result, as shown in FIG. 7, when the front massage part 200 rotates with one end thereof being coupled to the upper end of the backrest part 100, an inner surface of the front massage part 200 comes into contact with the abdomen or chest of the user. At this time, the controller 530 receives a predetermined pressure value from the first pressure sensor, the controller 530 may control the rotation driving unit to stop the driving thereof, thereby preventing an excessive pressure due to the hinge driving of the front massage part 200 from being applied to the abdomen or chest of the user.

In addition, for embodying the present invention, when the user is seated on the massage chair, the controller 530 receives a pressure value from the second pressure sensor installed in the seat cushion part 400 of the massage chair. In this case, it may be configured in such a way that the controller 530 sequentially controls the vertical driving unit 550 and the rotation driving unit 570 as described above, thereby even if the user does not input a separate operation command through the operation panel unit 510, the front massage part 200 is automatically installed in front of the user as shown in FIGS. 3 to 7.

Meanwhile, it is necessary to prevent an accident in which the user's head hits the front massage part 200 during automatically installing the front massage part 200 as shown in FIGS. 3 to 7. To this end, for embodying the present invention, it is preferable that, when receiving detection information from the proximity sensors installed in the inner edge portion of the head receiving part 270 of the front massage part 200, the controller 530 controls the rotation driving unit 570 to immediately stop the operation thereof, and then, outputs a warning message such as 'Be careful not to hit your head' through a speaker module provided in the main body unit 500 of the massage chair.

The terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

While the present invention has been described with reference to the preferred embodiments and modified examples, the present invention is not limited to the above-described specific embodiments and the modified examples, and it will be understood by those skilled in the related art that various modifications and variations may be made therein without departing from the scope of the present invention as defined by the appended claims, as well as these modifications and variations should not be understood separately from the technical spirit and prospect of the present invention.

INDUSTRIAL APPLICABILITY

The present invention can be applied to the massage chair, such that industrial applicability thereof may be recognized in the massage chair related industrial fields.

The invention claimed is:

1. A massage chair comprising:

a backrest configured to support a back of a user; a front massager rotatably coupled to the backrest through one end of the front massager thereof, the front massager being configured to perform a massage on an abdomen or a chest of the user; and a head receiver defined in the front massager, the head receiver having an opening configured to receive a head of the user, wherein the front massager is configured to be located in front of the user by rotation of the front massager, and wherein the head receiver is configured to expose the head of the user at one portion of the front massager through the head receiver and the front massager is configured to be in contact with the abdomen or the chest of the user when the front massager is located in front of the user by the rotation of the front massager.

2. The massage chair according to claim 1, wherein the front massager is slidably coupled to a rear surface of the backrest.

3. The massage chair according to claim 1, wherein the front massager is configured to rotate in a hinged manner from the upper end of the backrest to the front of the user.

* * * * *